United States Patent
Nishiyama et al.

(10) Patent No.: US 6,520,659 B2
(45) Date of Patent: Feb. 18, 2003

(54) VEHICULAR HEADLAMP APPARATUS WITH A WASHING FUNCTION

(75) Inventors: Masaru Nishiyama, Shizuoka (JP); Yasuo Teranishi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 55 days.

(21) Appl. No.: 09/792,827

(22) Filed: Feb. 23, 2001

(65) Prior Publication Data

US 2001/0030874 A1 Oct. 18, 2001

(30) Foreign Application Priority Data

Feb. 25, 2000 (JP) ........................................ 2000-049365
Feb. 25, 2000 (JP) ........................................ 2000-049366

(51) Int. Cl.$^7$ .............................. F21V 33/00; B60S 1/46
(52) U.S. Cl. .......................... 362/96; 362/507; 362/546; 239/284.2
(58) Field of Search ........................... 362/96, 513, 514, 362/507, 546; 239/284.3

(56) References Cited

U.S. PATENT DOCUMENTS 5,769,528 A    6/1998  Dinant ........................ 362/96

FOREIGN PATENT DOCUMENTS

| DE | 4121316 C2  | 1/1992  |
| DE | 4401744 C2  | 7/1994  |
| EP | 0 508 853 A1 | 10/1992 |
| FR | 2651188     | 3/1991  |
| GB | 2323271     | 9/1998  |

Primary Examiner—Stephen Husar
(74) Attorney, Agent, or Firm—Koda & Androlia

(57) ABSTRACT

A vehicular headlamp apparatus with a washing function for washing the transparent member of the headlamp apparatus, comprising a washing unit for washing the surface of the transparent member and a light irradiation unit installed in a lamp housing comprised of the transparent member and a lamp body. The nozzle section of the washing unit that includes an injection nozzle and horizontally movable has a cover assembly. When washing the injection nozzle is moved to project out of the lamp apparatus and injects washing liquid to the transparent member. When washing is not performed, the injection nozzle is retracted inside the lamp apparatus and the decoration cover assembly forms the front surface of the headlamp apparatus together with its transparent member.

8 Claims, 15 Drawing Sheets

VEHICULAR HEADLAMP APPARATUS WITH A WASHING FUNCTION

BACKGROUND OF THE INVENTION

1. Field of the Invention

The present invention relates to a vehicular lamp and more particularly to a vehicular lamp apparatus with a washing mechanism.

2. Prior Art

A lamp washer device (or a lamp cleaner device) that removes dirt on a lens surface of a vehicular headlamp by water jet is known.

FIG. 16 shows one example of such a lamp washer device. In this lamp washer device b, a cover d that is formed from an opaque material is provided at the end of an injection nozzle section c. When the washer device b is not in use, the cover d abuts against the bumper a, and the opening e formed in the bumper a is closed by the cover d. When the washing device b is in use, as shown by the dashed-lines in FIG. 16, the injection nozzle section c and the cover d are moved upward by a driving mechanism (not shown) installed in the washing device b. As a result, the injection nozzle section c protrudes outside of the vehicle through the opening e formed in the bumper a; and the washing liquid is injected toward the lens surface f of the lighting device.

However, in the above lamp washer device, since the washing device b is installed in the bumper a, there is a problem that it takes a lot of troubles to adjust the injection position of the nozzle to the lens surface f of the lighting device. In other words, in order to set the position of the injection nozzle with reference to the lens surface constantly at the time of washing, a high positional accuracy is required at the time of installation of the washing device in the vehicle body.

The washing device described above has further problems. The appearance of the lighting device tends to be impaired when the cover d provided on the injection nozzle section c projects from the bumper a. Also, it is necessary to form the opening e in the bumper a so that the injection nozzle section c is raised therethrough.

SUMMARY OF THE INVENTION

Accordingly, the object of the present invention is to provide a vehicular headlamp apparatus provided with a washing function in which the positioning of an injection nozzle with respect to the lens surface of the headlamp apparatus is facilitated, and at the same time an unfavorable effect that the cover of the injection nozzle have on the appearance of the lamps is eliminated The above object is accomplished by a unique structure for a vehicular lighting fitting or a vehicular headlamp apparatus that includes:

a light irradiation unit provided in a lamp housing which is comprised of a transparent member and a lamp body, and a washing unit for washing the surface of the transparent member, and the unique structure of the present invention involves:

(1) a decoration cover assembly that is provided on the nozzle section of the washing unit that has an injection nozzle; and (2) the nozzle section that is supported so as to be movable between a first position where the nozzle section protrudes beyond the surface of the transparent member for washing the transparent member and a second position where the nozzle section is retreated from the surface of the transparent member after washing of the transparent member; and wherein (3) at the second position, the surface of the decoration cover assembly form a front face of the lighting fitting together with the surface of the transparent member, so that the decoration cover assembly is visually recognized as part of a unit that functions independently from the light irradiation unit.

According to the present invention as described above, the headlamp apparatus has a washing unit that is built therein. Accordingly, the positional accuracy of the injection nozzle with reference to the transparent member can be obtained based only upon the mounting accuracy of the washing unit to the headlamp apparatus. Furthermore, when the injection nozzle is moved in the headlamp apparatus, the surface of the decoration cover assembly provided on the nozzle forms the front face of the headlamp apparatus together with the surface of the transparent member. Thus, the appearance of the headlamp apparatus is not impaired.

The unique structure of the present invention further includes:

(4) the washing unit injects the washing liquid from the injection nozzle section to the transparent member when the washing unit is moved to protrude forward from the surface of the transparent member at the time of washing the member;

(5) a cover assembly is provided on the washing unit that includes the injection nozzle;

(6) a reflection section is provided inside the cover assembly so that the light that enters the cover assembly from a light source that forms the light irradiation unit is reflected by the reflection section and radiates frontward.

In the above structure of the present invention, since the headlamp apparatus contains the washing unit, the positional accuracy of the injection nozzle to the transparent member is obtained based only on the mounting accuracy of the washing unit to the headlamp apparatus. Further, since the cover assembly is provided on the injection nozzle and the reflection section is provided in the cover assembly, the cover assembly can be radiant by the light from other light source. As a result, the cover assembly is visually recognized from the outside as if it were a lamp, enhancing the appearance of the headlamp apparatus.

DETAILED DESCRIPTION OF THE INVENTION

The vehicular headlamp apparatus or the lighting fitting provided with a washing function according to the present invention comprises a lamp housing that is composed of a transparent member (that is a lens formed from a transparent material, a transparent cover having no lens effect, and the like) and a lamp body. A light irradiation unit (a light source and a reflecting mirror, plus a lens member if necessary) is provided inside the lamp housing. Thus, the lighting fitting involves a plurality of units, in particular, the light irradiation unit and a washing unit (lamp washer unit) for washing the surface of the transparent member (that is a lens).

Moreover, the nozzle section of the washing unit (the nozzle section has an injection nozzle) is provided with a decoration cover assembly (nozzle cover). The cover assembly is formed from an opaque material so that the washing unit is not fully exposed when the lighting fitting is viewed from the front. However, the decoration cover assembly can be designed so as to attain a harmony of appearance with the lens surface, and such decoration cover assembly includes:

(I) a type in which the decoration cover assembly pretends a dummy lens that is not lit; and (II) a type in which the decoration cover assembly serves as a lens of actual lighting ("actual lighting" includes false lighting through the use of reflected light).

In the above structure that involves the decoration cover assembly, a reflection section is installed in the cover assembly so that the light that entered the cover assembly from a light source of the light irradiation unit is reflected by the reflection section and radiates frontward. In this structure, the cover assembly is used as a lens where light is actually lit, thus enhancing the appearance and improving the use of light. It is possible to provide a light source in the cover assembly so that the entire cover assembly forms a single light irradiation unit. However, with this structure, the washing unit tends to become large as a whole and a burden of mechanical driving is imposed on the cover assembly and the injection nozzle. Thus, the structure that provides the reflected light by utilizing the light from other light source (and not from the light source installed in the cover assembly) is more effective from the standpoint of improving the luminous flux utilization factor. In other words, the light that would be otherwise blocked by the cover assembly can be used efficiently by the use of the reflection section.

Figure 1:
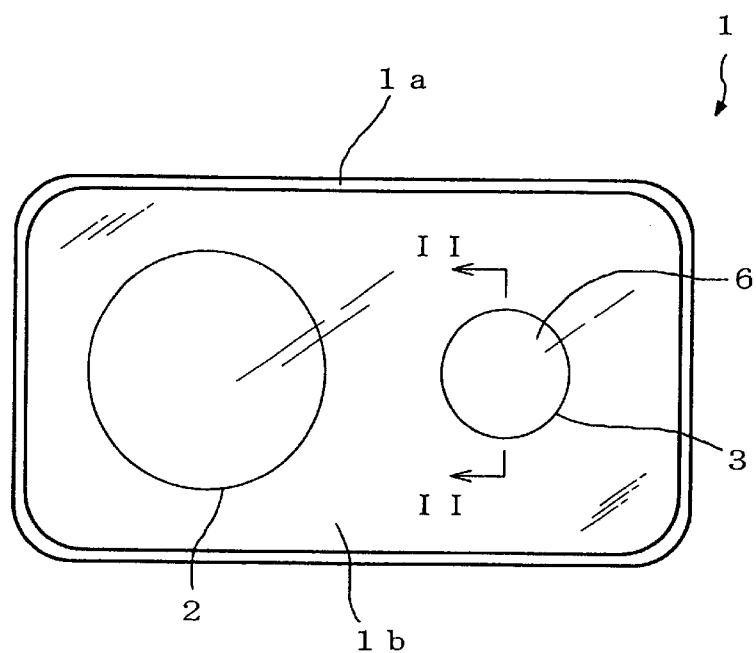
FIG. 1 is a front view of one example of the basic configuration of the vehicular lighting fitting or a headlamp apparatus according to the present invention.
Figure 2:
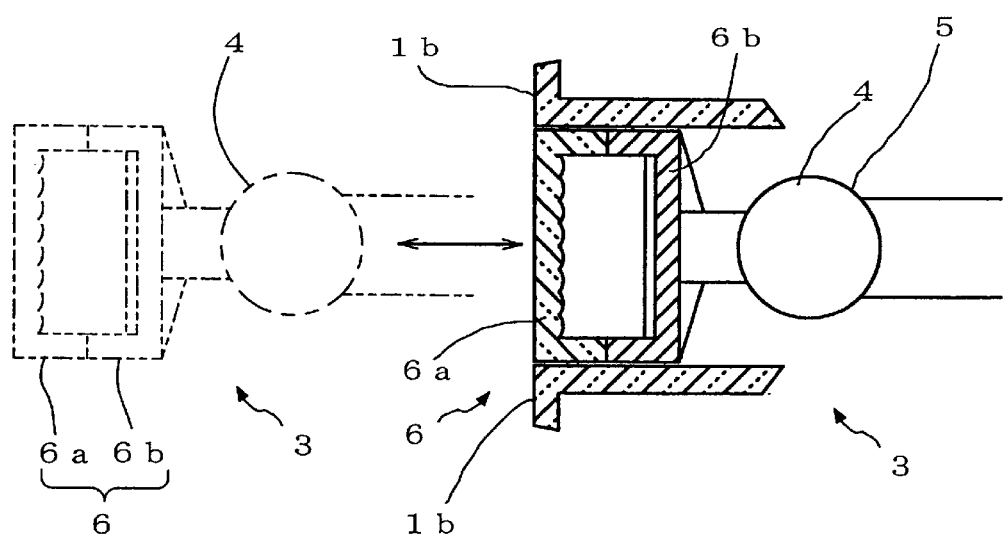
FIG. 2 is an enlarged sectional view taken from the lines II—II of FIG. 1.
Figure 3:
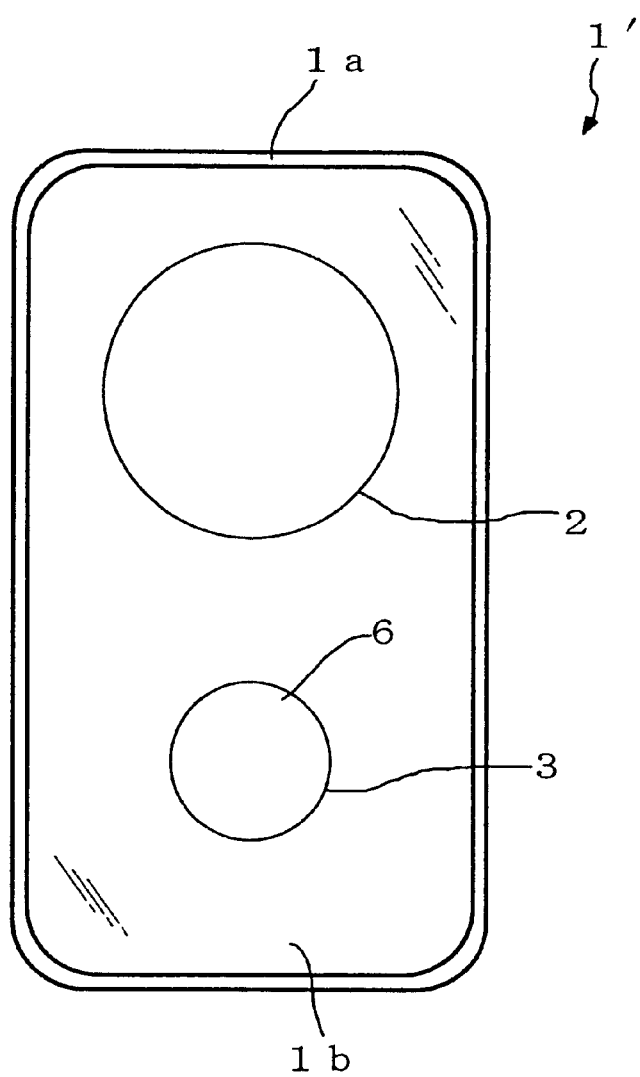
FIG. 3 is a front view of the vertical type lighting fitting according to the present invention.

FIGS. 1 to 3 show the examples of the basic configuration of the lighting fitting in which the decoration cover assembly is designed so as to pretend a dummy lens.

As seen from FIG. 1, the vehicular lighting fitting 1 is provided with a light irradiation unit 2 and a washing unit 3 that are arranged in the horizontal direction.

More specifically, a lighting fitting space is formed by a lamp body 1a that constitutes the lighting fitting 1 and a transparent member 1b that covers the front face of the lamp body 1a. The light irradiation unit 2 and the washing unit 3 are arranged laterally (horizontally) in this lighting fitting space. The light irradiation unit 2 includes, for instance, a lamp structure of the so-called projector type that uses a projection lens, an ellipsoid reflecting mirror, and the like, and it also includes a multi-surface reflecting mirror (or step reflectors) whose reflecting surface is composed of a number of reflector steps. In such a case, the transparent member 1b is a plain cover with no lens steps formed thereon or a cover on which slight number of lens steps are formed. On the other hand, in case where the reflecting mirror that forms the light irradiation unit 2 is, for instance, a reflecting mirror with a paraboloid of revolution that does not have a sufficient optical effect in controlling a vehicular light flux distribution only by itself, then a number of lens steps are formed on an area of the transparent member 1b that faces the reflecting surface of the reflecting mirror.

FIG. 2 shows the main portion (a portion toward the front end and vicinity thereof) of the washing unit 3, wherein a nozzle section 5 that includes an injection nozzle 4 is provided with a decoration cover assembly 6. It is this portion that is recognized when viewed from the front of the lighting fitting of FIG. 1.

The nozzle section 5 is, as shown by the dashed-lines, provided so as to be movable between a position where the nozzle section 5 protrudes beyond the surface of the transparent member 1b for washing such a surface (this will be referred to as a "first position") and a position where the nozzle section 5 is retreated from the surface of the transparent member 1b after washing of the transparent member (this will be referred to as a "second position"). The driving method of the nozzle section 5 may be chosen arbitrarily. One example uses a cylinder and a piston as will be described later. In this cylinder-piston structure, a washing liquid is supplied from a washing liquid tank into the cylinder by a liquid sending pump, so that a pressure rise caused by the supplied washing liquid in the cylinder moves the piston, thus protruding the injection nozzle provided at the tip end of the piston. When injection of the washing liquid is ended, in accordance with the pressure reduction in the cylinder, the piston withdraws into the cylinder by elastic repulsive component such as a coil spring and returns to its original position.

In the shown example of FIGS. 1 and 2, an opening (not shown) or an injection tip of the injection nozzle 4 is disposed so as to face laterally; and at the first position described above, the washing liquid is injected toward the light irradiation unit 2 (more specifically, the outer surface of the light irradiation unit 2).

When the nozzle section 5 is not in use, it retreats to the second position, so that the surface of the decoration cover assembly 6 is flush with the surface of the transparent member 1b and forms the front face of the lighting fitting together with the transparent member 1b as shown by the solid lines in FIG. 2. Accordingly, when viewed the front shape of the lighting fitting, the decoration cover assembly 6 is recognized as a part of a unit that functions independently of the light irradiation unit 2, and the appearance is thus enhanced.

It is preferable that either a transparent member or a lens member is formed on the decoration cover assembly 6. The reason for this is that since the surface of such a transparent member or a lens member, at the washing unit's second position, forms the front face of the lighting fitting together with the transparent member 1*b*, the front face of the lighting fitting can be recognized as a united single lens surface without causing a sense of incongruity in the appearance.

In FIG. 2, the decoration cover assembly 6 is comprised of a transparent cover member (or a lens) 6*a* provided at the front side thereof and a body member 6*b* provided at the rear side thereof, and lens steps (cylindrical steps, fish-eye lens steps, and the like) are formed on either or both of the transparent cover member 6*a* and the body member 6*b*. With this structure, the appearance of the cover assembly 6 as a dummy lens is further enhanced. As a result, a visual effect as if the decoration cover assembly 6 were a lamp when viewed from the front of the lighting fitting can be obtained. The transparent cover member 6*a* may be colorless and transparent, or the transparent cover member 6*a* may be colored and transparent to give it a functional color of a lamp (by way of a method in which the transparent member or the lens member is formed from a colored and transparent material, for instance). Moreover, the body member 6*b* can be formed from an opaque material. A refection coating can be deposited on the surface of the body member 6*b* so as to form a reflecting surface, or reflector steps can be formed on the surface of the body member 6*b*. In any event, it is preferable that the decoration cover assembly be formed so that the injection nozzle 4, the main section of the washing unit 3, and the like are hardly recognized visually from the front of the lighting fitting.

The vehicular lighting fitting according to the present invention is not limited to the structure shown in FIG. 1. The light irradiation unit 2 and the washing unit 3 can be provided in the vertical direction, as in the lighting fitting 1' shown in FIG. 3. In this vertical arrangement, the injection tip of the injection nozzle 4 is set so as to face upward; and at the first position, the washing liquid is injected toward an upper portion of the transparent member 1*b* where the light irradiation unit 2 is located.

In the above-described example, the washing unit 3 is accommodated in the lamp housing. However, the present invention is not limited to this structure. For instance, the cover assembly of the washing unit can be provided at any position close to either the lamp body or the light irradiation unit. With this configuration, it is possible to increase the freedom of design choice, and it is also possible to make the lighting fitting compact. In other words, with the structure in which the cover assembly of the washing unit is provided close to either the lamp body or the light irradiation unit, when the injection nozzle of the washing unit is retreated and takes the second position, the surface of the cover assembly forms the front face of the lighting fitting lens together with the transparent member (a lens member or the like) that forms the lighting fitting (or the light irradiation unit).

FIGS. 4 to 8 show the examples of the basic configuration of the type in which the decoration cover assembly serves as a lens of actual lighting.

Figure 4:
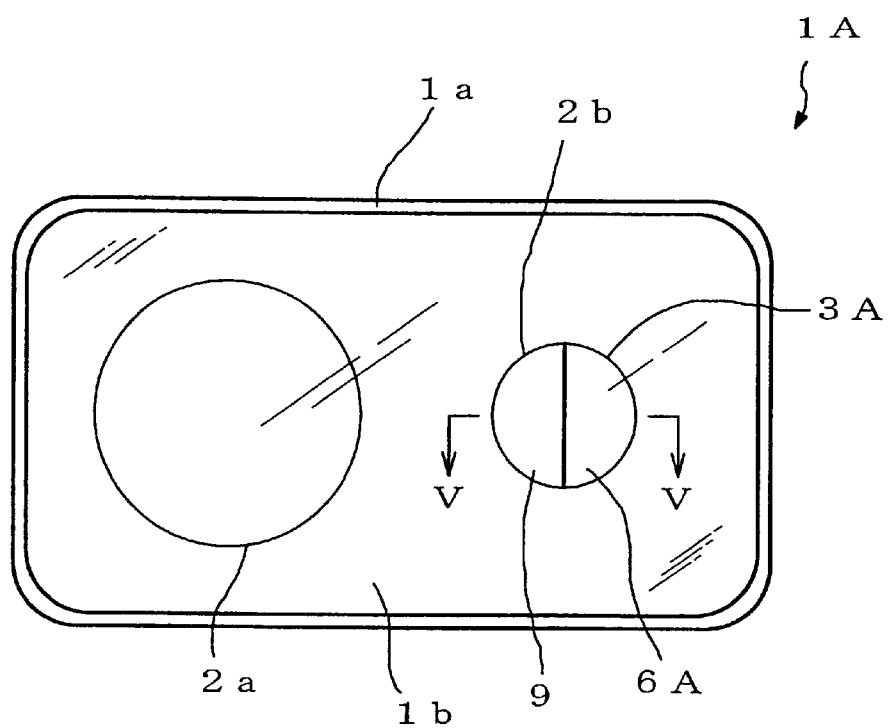
FIG. 4 is a front view of the lighting fitting equipped with the washing unit, the washing unit being provided adjacent to the secondary irradiation unit.
Figure 5:
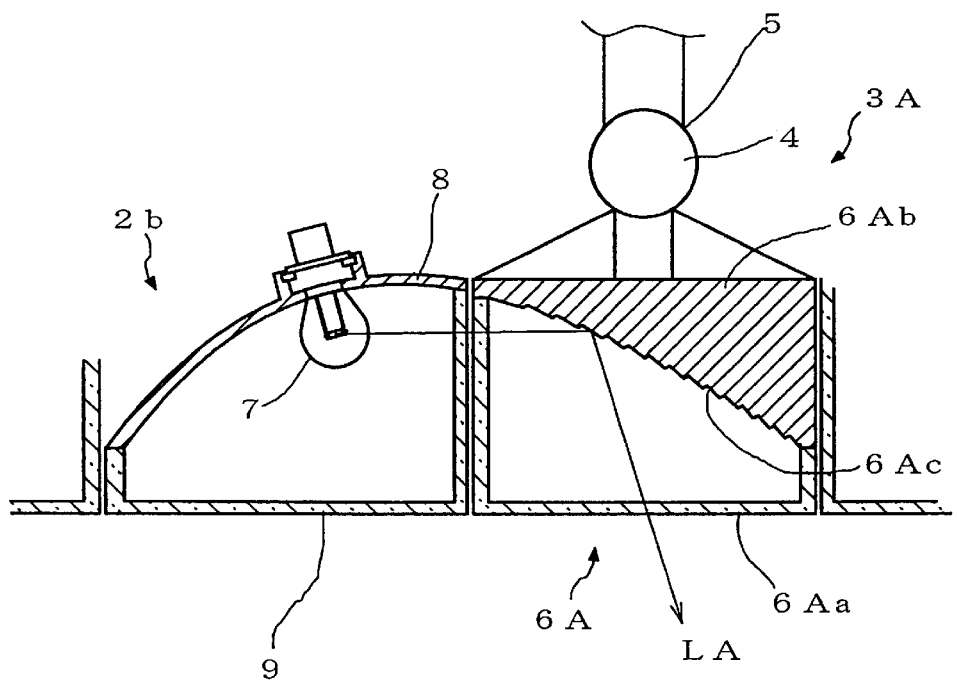
FIG. 5 is an enlarged sectional view taken from the lines V—V of FIG. 4.
Figure 6:
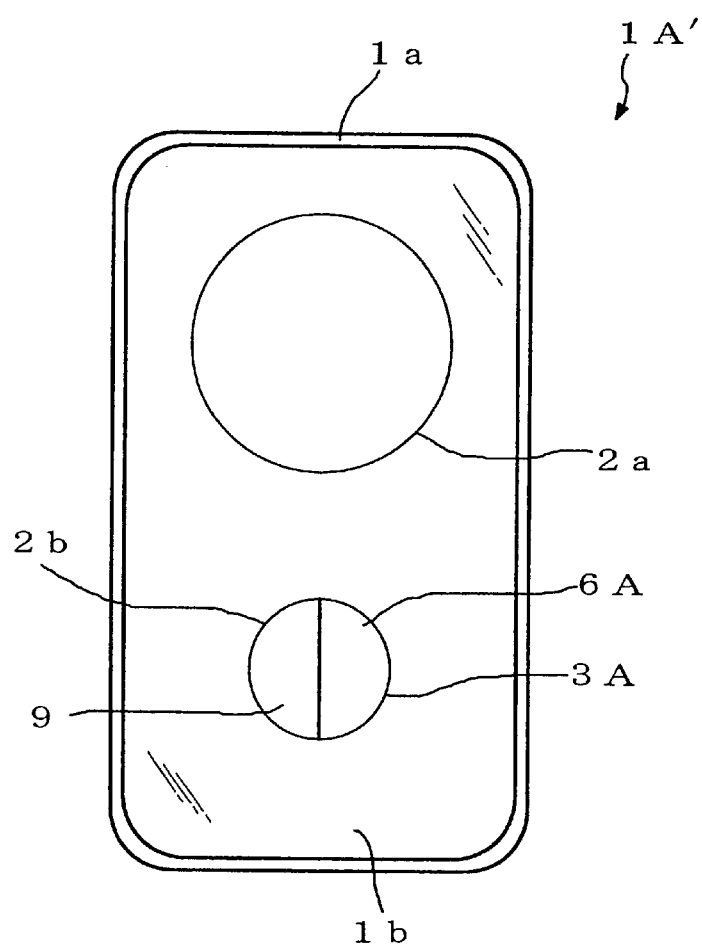
FIG. 6 is a front view of the vertical type lighting fitting according to the present invention.

In the vehicular lighting fitting 1A shown in FIGS. 4 and 5, a main light irradiation unit 2*a*, a secondary irradiation unit 2*b*, and a washing unit 3A are arranged in the horizontal direction. The lighting fitting 1A has the differences from the lighting fitting 1 shown in FIGS. 1–3 as described below.

In particular, the secondary irradiation unit 2*a* is provided adjacent to the washing unit 3A when viewed from the front of the lighting fitting 1A. Thus, these two units are recognized as a single component in appearance.

Furthermore, a reflection section 6A*c* is formed in the decoration cover assembly 6A of the washing unit 3A, and the light that entered the decoration cover assembly 6A from a light source 7 (an incandescent lamp or the like) that forms the secondary irradiation unit 2*b* is reflected by the reflection section 6A*c* and radiates frontward.

More specifically, as seen from FIG. 5, the secondary irradiation unit 2*b* (e.g., an auxiliary lamp such as a clearance lamp) is comprised of a light source 7, a reflecting mirror 8 for reflecting the light of the light source 7 frontward, and a lens member 9 attached so as to cover the reflecting mirror 8 from the front.

In the washing unit 3A, the decoration cover assembly 6A provided at the front portion of the injection nozzle 4 is comprised of a transparent cover member (or a lens) 6A*a* and a body member 6A*b*. On the body member 6A*b*, a refection section 6A*c* is formed. The refection section 6A*c* reflects the light from the light source 7 frontward. The shown reflection section 6A*c* has a plurality of reflector steps, and the surface of each step is treated with reflection processing. In this structure, a part of the light emitted from the light source 7 is, as indicated by an arrow "LA" in FIG. 5, enters the cover member (or the lens) 6A*a* and is subsequently reflected by the reflection section 6A*c*. Accordingly, the decoration cover assembly 6A has an auxiliary function to control the light with respect to the secondary irradiation unit 2*b* when the nozzle section 5 takes the second position and the light source 7 is lit. In other words, the light from the light source 7 is emitted through both the lens member 9 and the decoration cover assembly 6A. Accordingly, though the decoration cover assembly 6A is originally designed as a cover for the washing unit 3A, when the light source 7 is lit, the decoration cover assembly 6A is visually recognized as if it were a part of the light irradiation unit.

In the above example, when the nozzle section 5 protrudes frontward and takes the first position, the washing liquid is injected from the injection nozzle 4 toward the main light irradiation unit 2*a* or the toward the main and secondary irradiation units 2*a* and 2*b*.

In the shown example of FIGS. 4 and 5, the irradiation units 2*a* and 2*b* and the washing unit 3A are arranged in the horizontal direction. However, the invention is not limited to this, and they can be arranged in a variety of forms including a vertical configuration. In the vertical configuration, the secondary irradiation unit 2*b* and the washing unit 3A are arranged below the main light irradiation unit 2*a*, and the injection tip of the injection nozzle 4 is set to face upward.

Figure 7:
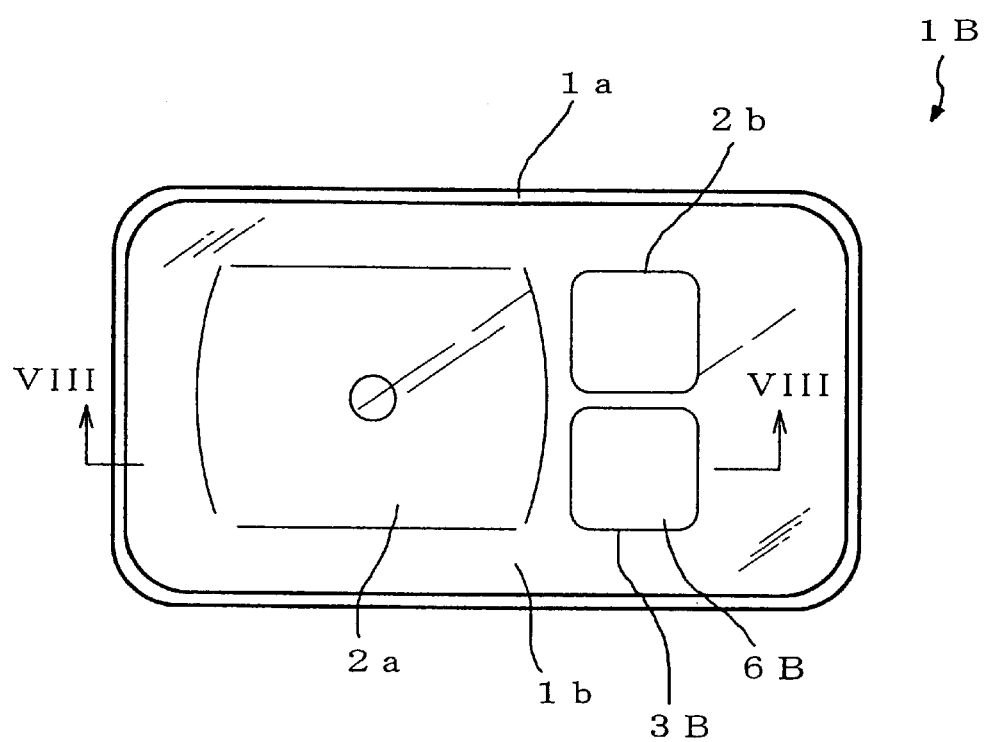
FIG. 7 is a front view of the lighting fitting equipped with the washing unit that is arranged immediate on the right side of the main light irradiation unit.
Figure 8:
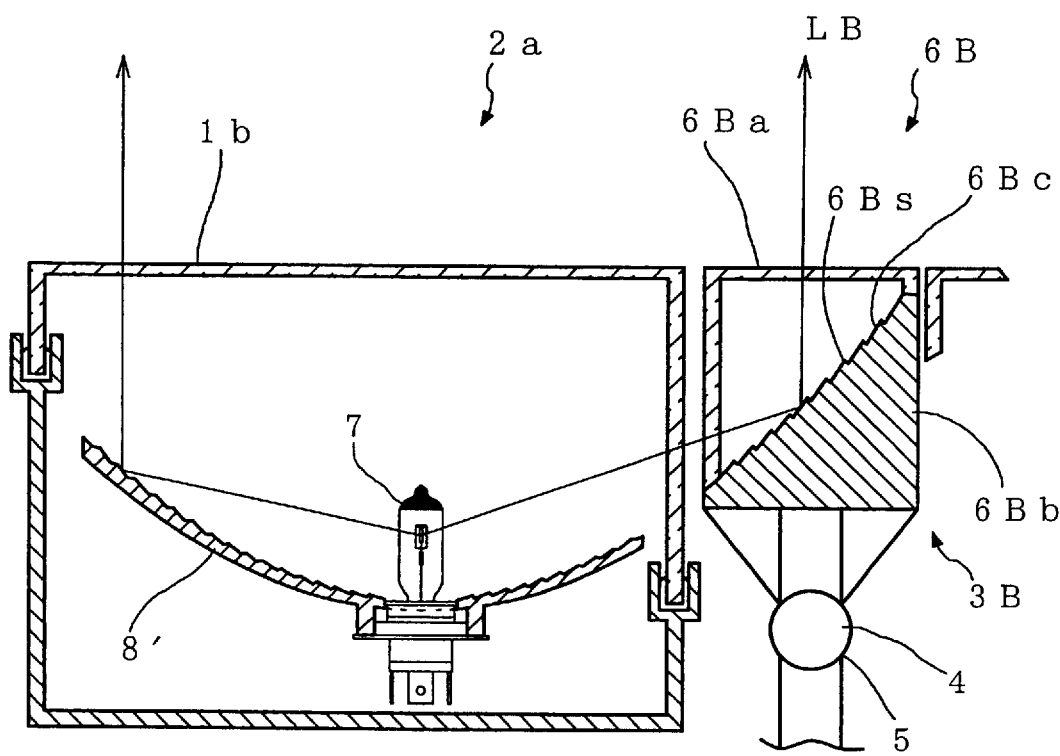
FIG. 8 is an enlarged sectional taken along the lines VIII—VIII of FIG. 7.

It is further possible to design so that the light from the light source of the main light irradiation unit is brought into the interior of the decoration cover assembly of the washing unit and then reflected frontward as shown in FIGS. 7 and 8.

FIGS. 7 and 8 show a vehicular lighting fitting 1B in which a secondary irradiation unit 2*b* (an auxiliary lamp such as a turn signal lamp) and a washing unit 3B are provided immediate to the right of the main light irradiation unit 2*a*. The secondary irradiation unit 2*b* and the washing unit 3B are arranged in the vertical direction.

As shown in FIG. 8, the main light irradiation unit 2*a* comprises a light source 7 (a halogen lamp, a discharge lamp, and the like) and a reflecting mirror 8' (e.g., a reflecting mirror with a paraboloid of revolution, a multi-surface reflecting mirror consisting of a number of reflector steps, and the like). The main light irradiation unit 2a further includes the transparent member 1b disposed in front of the reflecting mirror 8' (a lens member or a plain cover assembly). Thus, the main light irradiation unit 2a is used as, for instance, a headlamp of a vehicle.

As for the washing unit 3B, the decoration cover assembly 6B provided at the front portion of the injection nozzle 4 is comprised of a transparent member (or a lens) 6Ba and a body member 6Bb. On the body member 6Bb, a reflection section 6Bc for reflecting frontward light from the light source 7 of the main light irradiation unit 2a is formed. In other words, the body member 6Bb is formed with a plurality of reflector steps 6Bs. Consequently, a part of the light emitted from the light source 7 enters the cover assembly 6B and is reflected by the reflection section 6Bc as indicated by an arrow "LB" in FIG. 8. Thus, the decoration cover assembly 6B has an auxiliary function that is to control the light with respect to the main light irradiation unit 2a. In other words, the light is emitted from the transparent member 1b and also from the decoration cover assembly 6B, and the transparent member 1b and the decoration cover assembly 6B look to be both radiating.

In the above example in which the decoration cover assembly serves as a lens of actual lighting, the light that is obtained from the light irradiation unit 2a or the light irradiation unit 2b, the washing unit 3A is given a function radiate light frontward from the decoration cover assembly thereof. As a result, when the lighting fitting is lit, the washing unit 3A can appear as if it had a lamp function. Therefore, the washing unit 3A that has originally a different role from that of the light irradiation unit appears with an equivalent relationship to the light irradiation unit, thus enhancing the appearance of the lighting fitting.

Figure 9:
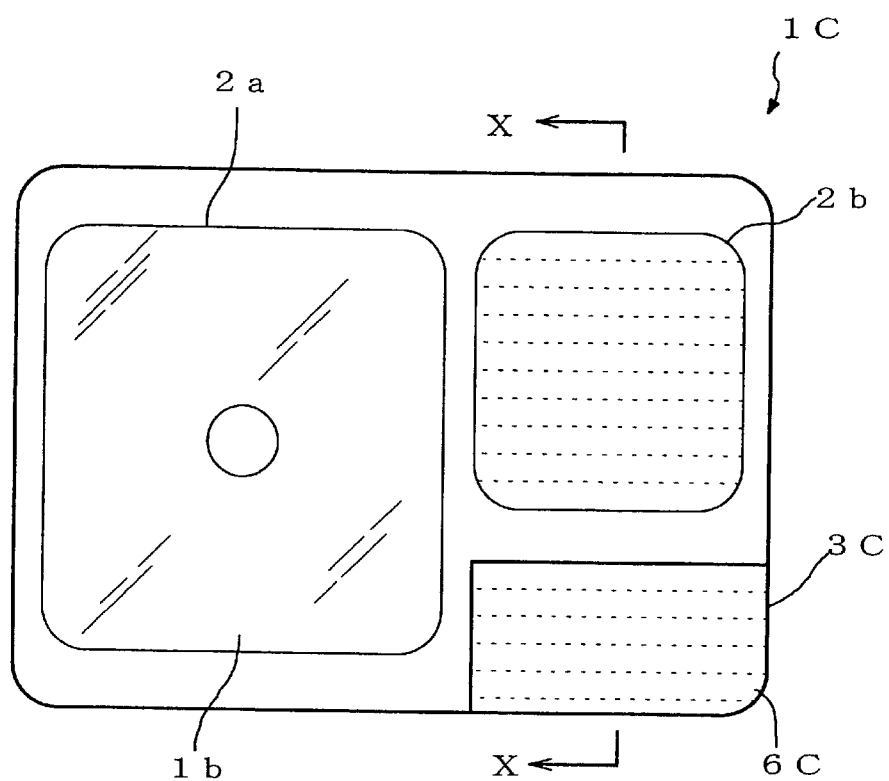
FIG. 9 is a front view of the lighting fitting wherein the washing unit is provided on the outer face of the lighting fitting.
Figure 10:
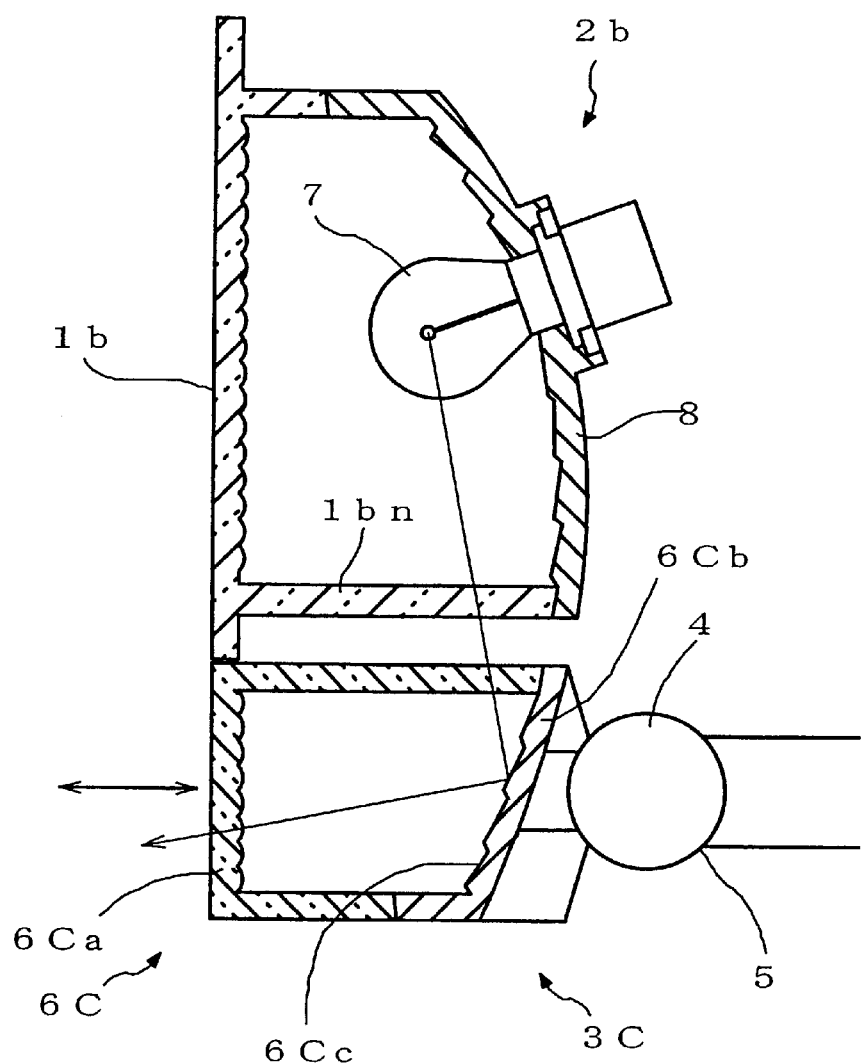
FIG. 10 is an enlarged sectional view taken from the lines X—X of FIG. 9.

In the above example, the washing unit is provided in the vehicular lighting fitting. However, the invention is not limited to this structure. The washing unit can be provided on an outer face of the vehicular lighting fitting. FIGS. 9 and 10 show such a lighting fitting 1C.

As seen from FIGS. 9 and 10, the main light irradiation unit 2a and the secondary irradiation unit 2b are installed in a vehicular lighting fitting 1C, and a washing unit 3C is provided at a lower part of a secondary irradiation unit 2b in the lighting fitting 1C.

The transparent member 1b forms the main light irradiation unit 2a and the secondary irradiation unit 2b, but a cover assembly 6C that is to be inserted fittingly to a partially notched portion (when viewed from the front) of the transparent member 1b forms the washing unit 3C. The main light irradiation unit 2a does not need to have special structural features, and all that is required is that the main light irradiation unit 2a has a general configuration comprising a light source and a reflecting mirror. Thus, a description thereof will be omitted.

FIG. 10 partially shows the secondary irradiation unit 2b and the washing unit 3C. The secondary irradiation unit 2b is composed of a light source 7 and a reflecting mirror 8 (on its reflecting surface, a plurality of reflector steps are formed). The secondary irradiation unit 2b further includes a portion of the transparent member 1b that covers the reflecting mirror 8 from the front.

As to washing unit 3C, the cover assembly 6C is composed of a transparent member (or a lens) 6Ca and a body member 6Cb. The body member 6Cb is provided at the front portion of the injection nozzle 4.

The body member 6Cb has a reflection section 6Cc for reflecting the light from the light source 7, and a plurality of reflector steps are formed on the reflection section 6Cc. Further, on an inner face area of the transparent member 6Ca that faces the reflection section 6Cc, a plurality of lens steps are formed.

In this example, the main section (not shown) of the washing unit 3C is attached on the side face of the lighting fitting 1C. When the nozzle section 5 is retreated to the second position and the light source 7 is turned on, a part of the light is reflected by the reflection section 6Cc and radiates frontward. In other words, a portion 1b n of the transparent member 1b is formed so as to reach the lower part of the reflecting mirror 8, and the light that passes through this portion 1bn further passes through the top face portion of the transparent member 6Ca and reaches the reflection section 6Cc.

Figure 11:
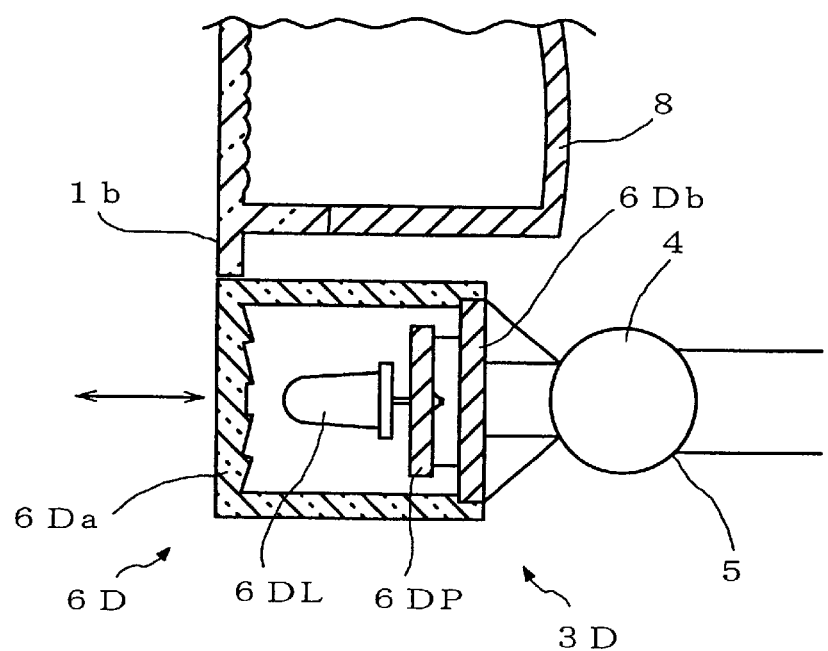
FIG. 11 is a sectional view of the light source installed in the cover assembly.

FIG. 11 shows another example in which the irradiation light is obtained by installing a light source in the cover assembly. Thus, in this structure, the light from another light source is not used in the cover assembly.

In the cover assembly 6D shown in FIG. 11, a light emitting diode 6DL as a light source and an attachment base plate 6DP thereof are installed in a lighting fitting space that is defined by a transparent member (or a lens) 6Da and a body member 6Db of the cover assembly 6D. A plurality of lens steps are formed on the inner face of the transparent member 6Da that is located in front of the light emitting diode 6DL.

In the structure of FIG. 11, the light generated by the light emitting diode 6DL radiates frontward through the transparent member 6Da. Thus, the light from another light source is not necessary. In addition, even at the first position where the cover assembly 6D and the nozzle section 5 protrude frontward, it is possible to irradiate the light.

By combining the color of the light from the light emitting diode 6DL and the color of the transparent member 6Da appropriately, a range of choice of color can be widened. This combination has a merit of increasing the degree of freedom in design choice. For instance, by setting the color of the light emission to be white and by setting the transparent member 6Da to be colorless and transparent, the function of a clearance lamp is realized. By setting the color of the light emission to be amber and by setting the transparent member 6Da to be colorless and transparent (or the color of the light emission is set to be white and the transparent member 6Da is set to be amber), the function of a turn signal lamp is realized.

FIGS. 12 to 15 show one embodiment of the present invention applied to a vehicular headlamp.

Figure 12:
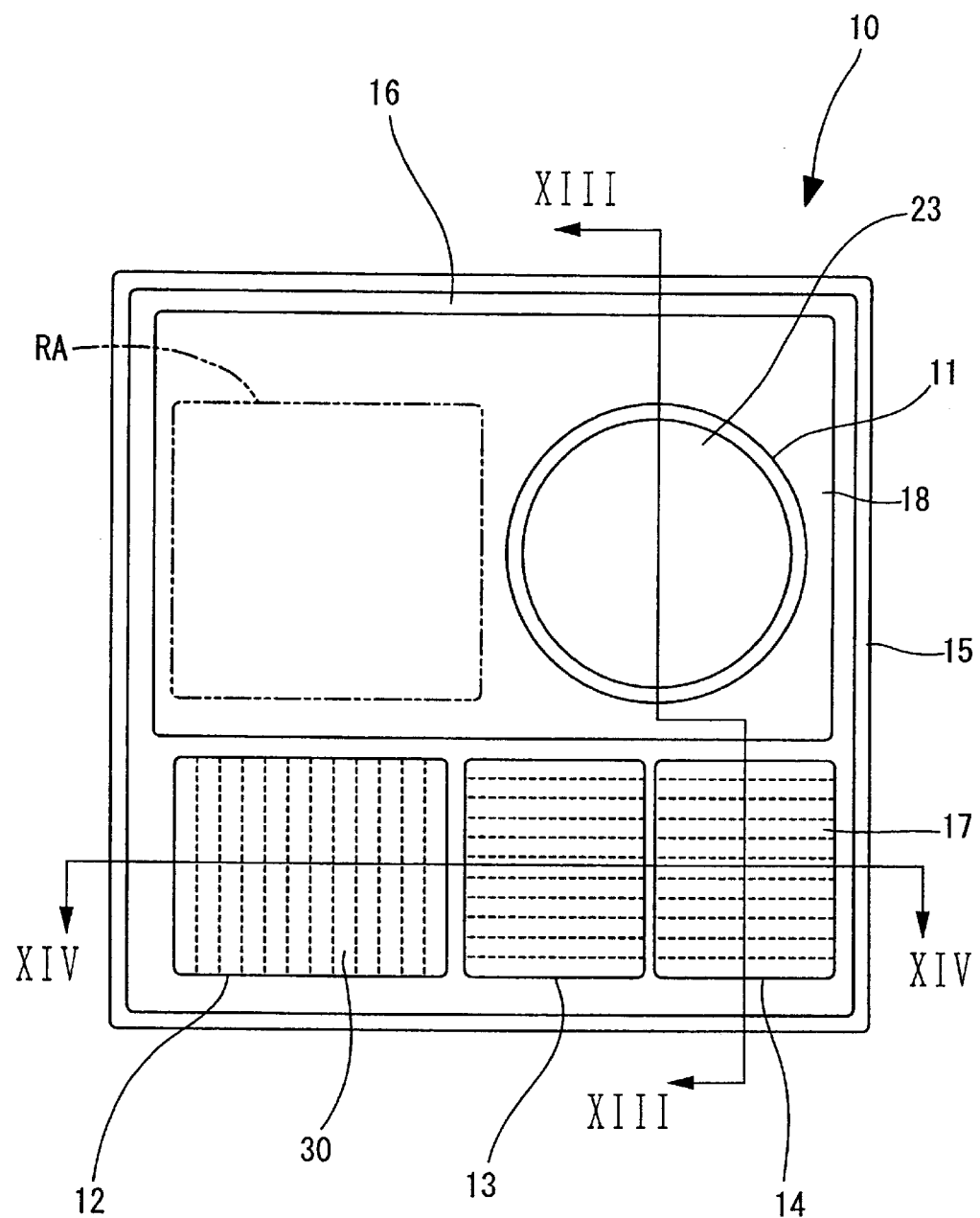
FIG. 12 shows the front of one embodiment of the vehicular lighting fitting according to the present invention.

As seen from FIG. 12, the headlamp apparatus 10 has generally a square front shape and includes a head light irradiation unit 11, a turn signal lamp unit 12, a parking lamp unit 13, and a lamp washer unit 14.

In this headlamp apparatus 10, a transparent synthetic resin cover member (a front lens) 16 that covers a front face of a lamp body 15 is a plain member on which no lens step is formed. Through this transparent cover member 16, the lens portion of each of the above-described lamp units is visually recognized from the outside of the headlamp apparatus. The lamp washer unit 14 is installed so that only its cover assembly 17 shows to the outside. Thus, the cover assembly 17 appears as a false lamp.

Figure 13:
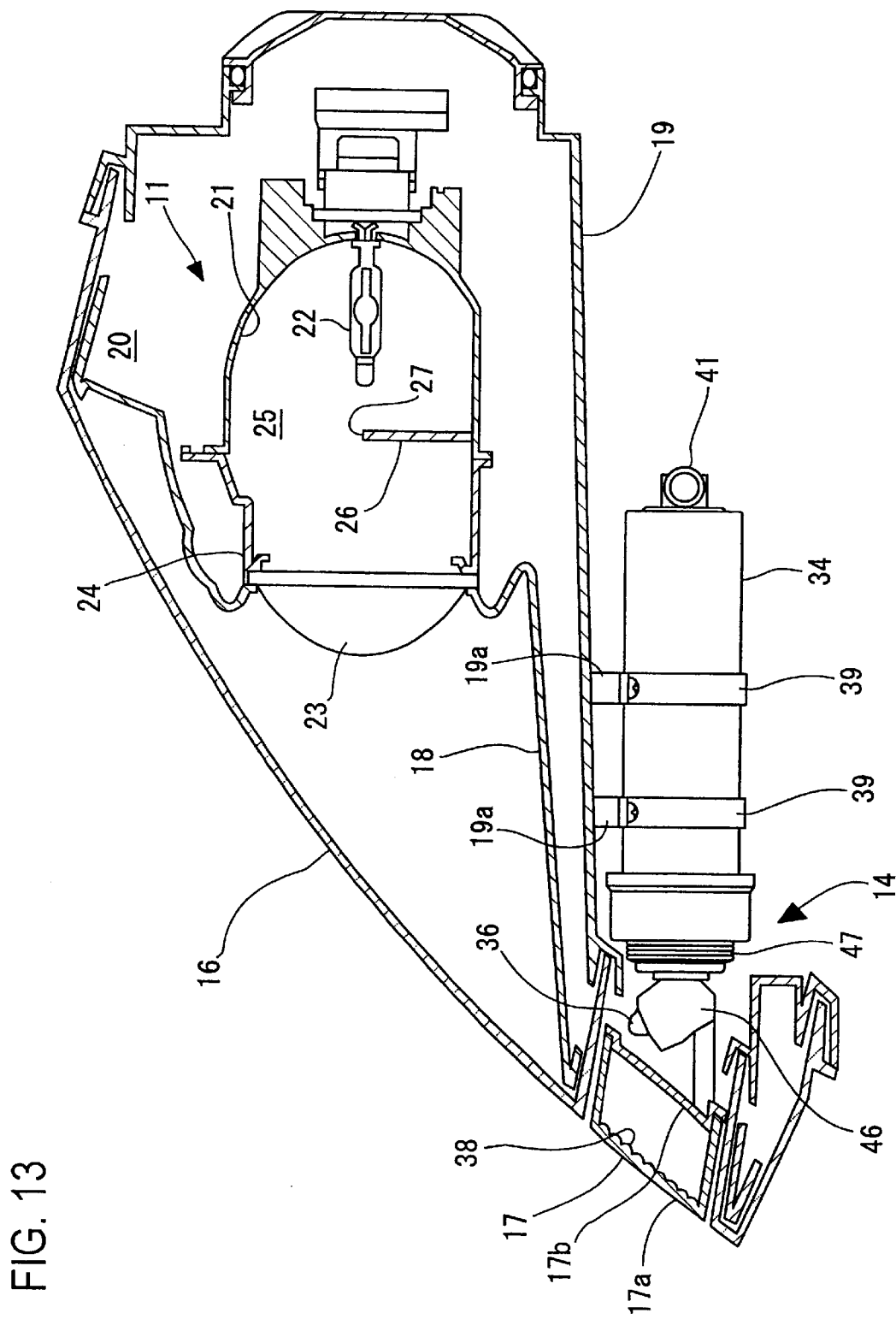
FIG. 13 is a longitudinal sectional view of the head light irradiation unit and the lamp washer unit taken along the lines XIII—XIII of FIG. 12.

As seen from FIG. 13, the head light irradiation unit 11 is installed in a space 20 that is defined by an inner panel 18, which is made of synthetic resin and disposed in the headlamp apparatus, and a body frame 19. The head light irradiation unit 11 has a projector type lamp structure. More specifically, the head light irradiation unit 11 comprises a reflecting mirror 21, a light source 22 (a discharge lamp is used) attached to the reflecting mirror 21, and a projection lens 23. A portion of the projection lens 23, except for a peripheral portion thereof, protrudes frontward through an opening formed on the inner panel 18 (this portion is recognized when viewed from the front of the headlamp apparatus). Furthermore, a light shielding member (a shade) 26 is installed in a space 25 that is defined by the projection lens 23, a support member 24 thereof, and the reflecting mirror 21. The light shielding member 26 is provided in front of the light source 22, so that it blocks the downward light from the light source 22 and plays, with its top edge 27, a role of limiting a light-and-shade boundary in the vehicular light distribution.

As shown in FIG. 12, the turn signal lamp unit 12 is positioned on the lower left of the head light irradiation unit 11. The turn signal lamp unit 12 makes a direction-indicating signal. The turn signal lamp unit 12 includes, as seen from FIG. 14, a reflecting mirror 28, a light-emitting light source 29 (a colored glass bulb or the like) for emitting light of a functional color (amber), and an inner lens 30.

A heat-resistant resin material is used for the reflecting mirror 28. The reflecting surface of the reflecting mirror 28 is subject to an evaporation treatment with aluminum or the like. A colorless transparent synthetic resin material is used for the inner lens 30 whose portion, except for its periphery, is visually recognized from the outside through the transparent cover member 16. On the inner face of the inner lens 30, lens steps that extend in the vertical direction are formed.

On the right side of the turn signal lamp unit 12, as shown in FIG. 12, the parking lamp unit 13 and the lamp washer unit 14 are installed side by side. The parking lamp unit 13 is installed closer to the turn signal lamp unit 12 than the lamp washer unit 14.

Figure 14:
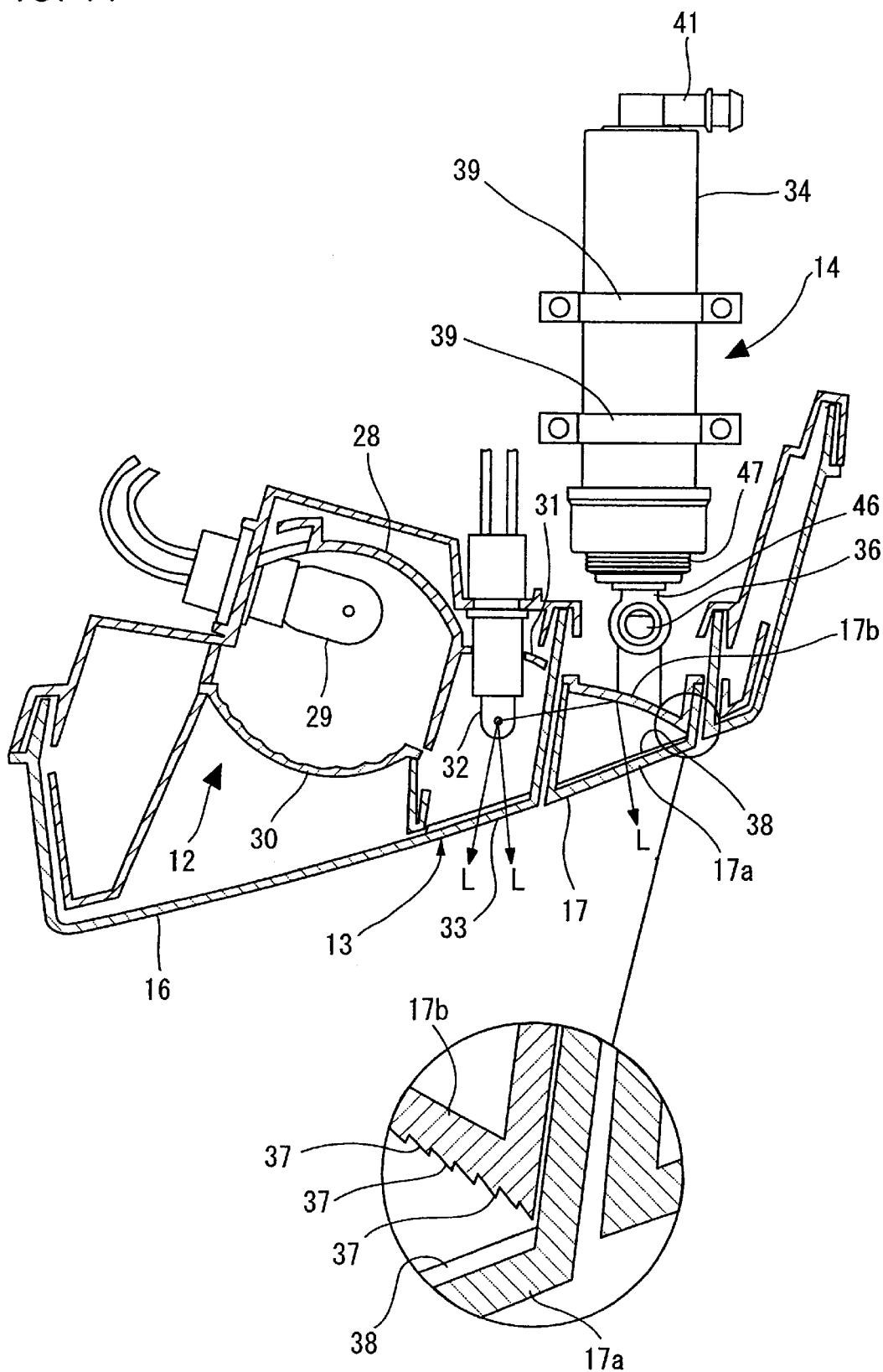
FIG. 14 is a horizontal sectional view of the parking lamp unit and the lamp washer unit of the embodiment shown in FIG. 12.

The parking lamp unit 13 is, as seen from FIG. 14, comprised of a reflecting mirror 31 that is provided on the reflecting mirror 28, a light source 32 such as an incandescent lamp, and a lens portion 33 of the transparent cover member 16. The lens portion 33 faces the reflecting mirror 31 and the light source 32, and lens steps that extend in the vertical direction are formed on the lens portion 33.

Figure 15:
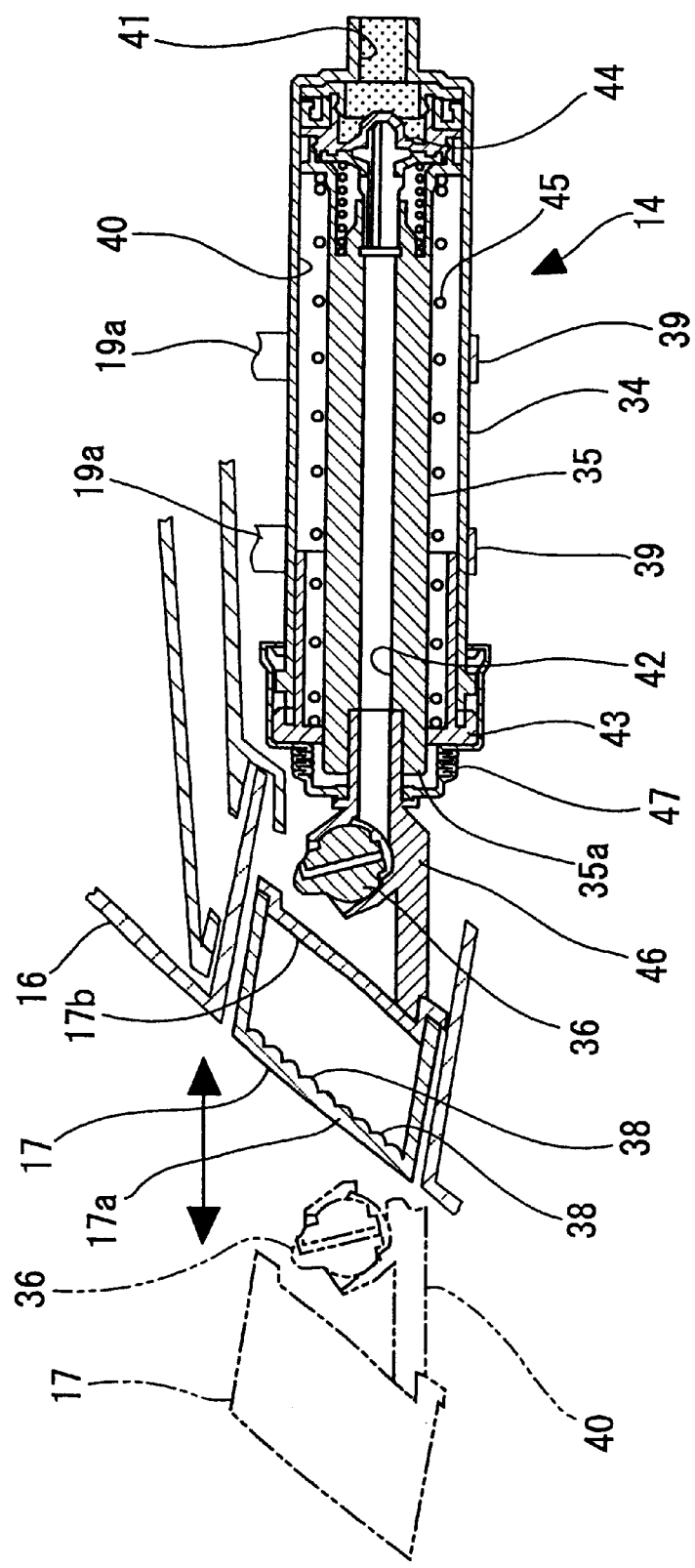
FIG. 15 is a longitudinal sectional view of the lamp washer unit of the embodiment shown in FIG. 12.
Figure 16:
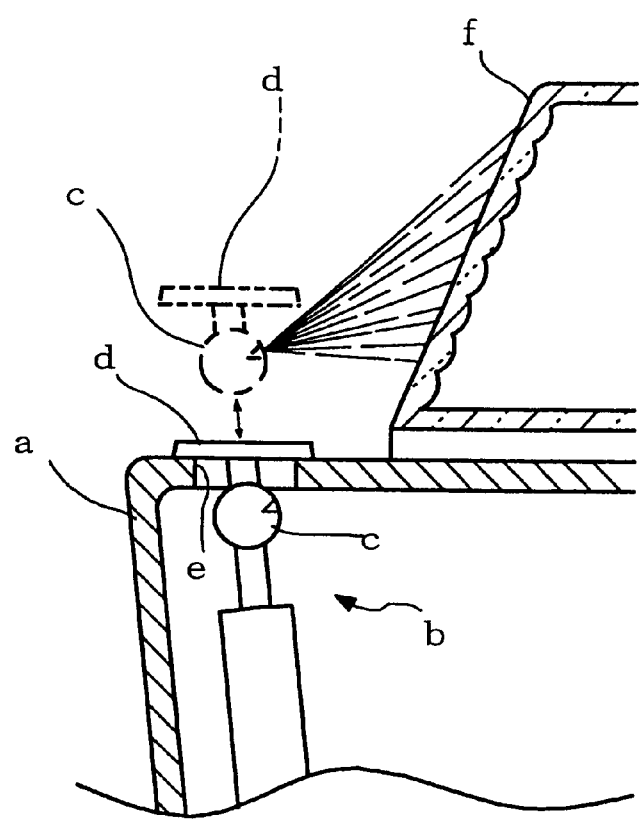
FIG. 16 shows an example of the conventional lamp washer device.

The lamp washer unit 14 comprises, as shown in FIGS. 13 to 15, a washer main body 34, a piston 35 that is supported telescopically by the washer main body 34 (see FIG. 15), an injection nozzle 36 provided at the end of the piston 35, and a cover assembly 17 installed further ahead (in an irradiation direction of the headlamp apparatus) of the injection nozzle 36.

The cover assembly 17 is comprised of a lens member 17a formed from a transparent material and a reflection section 17b formed from an opaque material. For example, as shown in the circle of FIG. 14, a plurality of reflector steps 37 are formed on the surface of the reflection section 17b that faces the front part of the lens member 17a, and these steps 37 are treated with reflection processing by aluminum evaporation or the like. Lens steps 38 that extend in the horizontal direction are formed on the inner face of the lens member 17a, thus a balanced harmony of appearance between the lens member 17a and the lens portion 33 of the parking lamp unit 13 is attained. The light emitted from the light source 32 of the parking lamp unit 13, as indicated by arrows L in FIG. 14, radiates frontward after passing through the lens-step formed portion 33. At the same time, a part of the light passes through the transparent cover member 16 and the lens member 17a and reaches the reflection section 17b, where the light is reflected by the reflector steps 37, then converted into the frontward (or slantingly frontward) irradiation light by the lens steps 38 of the lens member 17a, and emitted to the outside of the headlamp apparatus. The reflecting surface of the reflection section 17b can be formed as a single curved surface such as a paraboloid of revolution. However, with the multi-reflector steps 37, the freedom of design choice for directional control of the reflected rays at the respective reflector steps can be increased.

The shape of the cover assembly 17 when viewed from the front of the headlamp apparatus is designed so that it has a shape that can be inserted fittingly to a partial opening of the transparent cover member 16. In other words, at the time of not washing, the surface of the lens member 17a of the cover assembly 17 is flush with the surface of the transparent cover member 16 that is positioned close to the lens member 17a. When the light source 32 of the parking lamp unit 13 is turned on in this situation, the lens member 17a of the cover assembly 17 is lighted up together with the parking lamp unit 13 by the effect of the reflection section 17b. As a result, both of these components are lighted so as to look as if they were a united single body.

In the shown embodiment, the washer main body 34 is supported by, as seen from FIG. 13, fixing members 39, such as brackets and band members, and the fixing members 39 are fastened to, for instance, supporting members 19a formed on the body frame 19 of the headlamp apparatus by screws.

As seen from FIG. 15, the washer main body 34 comprises a cylinder 40 made from, for instance, a rigid synthetic resin material and a piston 35 that is installed in the cylinder 40 in a slidable fashion.

A washing liquid supply pipe 41 is connected to one end (rear end) of the cylinder 40, and the washing liquid is supplied thereto from a washing liquid tank (not shown) via a pump (not shown). The front end of the cylinder 40 is opened.

In the shank 35a of the piston 35, a central hollow 42 is formed so that it extends in the axial direction of the piston 35. A part of the shank 35a is inserted through an insertion hole of a cap 43 that is attached to the front end of the cylinder 40 to provide an outside covering, and a shut off valve 44 is attached to the rear end of the shank 35a. The shut off valve 44 is comprised of a tubular joint, a diaphragm, a spring-receiving ring, a valve-closing spring and other components.

A coil spring 45 is installed over the piston 35. The coil spring 45 is reduced to a compressed state between the piston and the cap 43, and thereby the piston 35 is pressed down to the end surface of the cylinder 40.

The injection nozzle 36 formed from a synthetic resin material is supported by a nozzle holder 46 attached to the front end of the piston 35, and the injection tip of the injection nozzle 36 is communicated with the central hollow 42 of the piston 35 via a passage. Accordingly, the washing liquid that reaches the front end of the piston 35 is injected from the injection tip of the injection nozzle 36.

A bellows cover 47 made of rubber is provided between the nozzle holder 46 and the cap 43. The bellows cover 47 expands and contracts according to the travel stroke of the piston 35 and thus prevents water, dust and the like from entering the cylinder 40.

When the washing liquid is supplied to the washing liquid supply pipe 41 from the washing liquid tank (not shown), and the pressure of the washing liquid acts on the diaphragm of the shut off valve 44. This pressure acts, as is, as a force that causes the piston 35 to move frontward. Accordingly, when the pressure overcomes the elastic force of the coil spring 45, the piston 35 is moved frontward.

When the piston 35 proceeds to a most protruded position (this corresponds to the above-described first position, and only the cover assembly 17 and the nozzle section are shown by the dashed-lines in FIG. 15), the movement of the piston 35 stops there. When hydraulic pressure further increases so that the pressure overcomes the elastic force of the spring to close the valve 44, the diaphragm of the shut off valve 44 bends forward and hence the shut off valve 44 opens to form the passage that communicates the central hollow 42 of the piston 35 with the washing liquid supply pipe 41. Then, the washing liquid reaches the injection nozzle 36 and subsequently is injected from the injection tip of the injection nozzle 36 to the outside so as to effect the washing of the outer surface of the transparent cover member 16.

After the washing operation completes, the hydraulic pressure of the washing liquid is reduced. As a result, the pressure becomes smaller compared to the elastic force of the spring 45, and the shut off valve 44 is closed, resulting in that the supply passage of the washing liquid to the injection nozzle 36 is shut off. At the same time, the position of the piston 35 returns to the position before the washing (the second position) by the restoring force of the coil spring 45.

In the above embodiment, the description is made for a single head light irradiation unit is provided in the headlamp apparatus. However, the present invention is not limited to this single head light irradiation unit. The present invention is applicable to structures in which a plurality of light irradiation units are used so as to perform the irradiation control of the head light. One example is shown in FIG. 12. In this example, as indicated by a square frame RA shown by the dashed-lines, an additional light irradiation unit (for example, a lamp unit composed of a light source, a reflecting mirror with a paraboloid of revolution, a group of lens steps formed on the transparent cover assembly, or the like) is installed on the left of the head light irradiation unit 11, so that a switchover of a passing-by beam and a high beam is performed by way of switching of lighting of the irradiation units.

As seen from the above, in the vehicular lighting fitting according to the present invention, the washing unit is built in the lighting fitting. Accordingly, a relative positional accuracy of the injection nozzle of the washing unit to a transparent member of the lamp can be secured by only the installation accuracy of the washing unit in the lighting fitting. Thus, the position setting of the nozzle of the washing unit can be done easily. Moreover, when the injection nozzle is housed in the lighting fitting, the outer surface of the decoration cover assembly provided on the nozzle forms a front face of the lighting fitting together with the outer surface of the transparent member. Accordingly, the washing unit hardly accompanies a sense of incongruity in the appearance by virtue of the cover assembly and hence does not impair the appearance of the lighting fitting noticeably.

Furthermore, in the present invention, the transparent member or the lens is formed on the decoration cover assembly so that the surface of the transparent member or the lens member forms the front face of the lighting fitting together with the transparent member or the lens member. Accordingly, the washing unit and the light irradiation unit appear so as to have an equal appearance with a sense of integrity, and the appearance of the lighting fitting is further enhanced.

Furthermore, according to the present invention, since the cover member is provided on the injection nozzle and the reflection section is installed in the cover member so that the cover member can be radiant by the light from other light source effectively. Accordingly, the cover member of the washing unit is visually recognized as if it were a lamp from the outside, and hence the appearance thereof can be enhanced.

In addition, according to the present invention, when the injection nozzle of the washing unit is retreated, the surface of the cover member forms the front face of the lighting fitting together with the transparent member. Accordingly, the cover member does not impair the appearance of the lighting fitting.

Furthermore, in the present the invention, the reflecting surface is formed on the reflection section of the cover member, and the reflection surface is designed so that the direction of the optical axis of the reflecting surface becomes the same or substantially the same as that of an adjacent light irradiation unit. Accordingly, the washing unit and the light irradiation unit appear so as to have an equal appearance with a sense of integrity, and the appearance is further enhanced.

What is claimed is:

1. A vehicular headlamp apparatus having a washing function, said apparatus being provided with a plurality of built-in its including:
    a light irradiation unit provided in a lamp housing that is composed of a lamp body and a transparent member which is a plane cover with no lens steps formed thereon or a cover on which slight number of lens steps are formed, and is visually recognized through said transparent member; and
    a washing unit for washing a surface of said transparent member, wherein
        a nozzle section of said washing unit that includes an injection nozzle is provided with a decoration cover assembly;
        said nozzle section is movable between a first position where said nozzle section protrudes frontward beyond a surface of said transparent member so as to wash said surface of said transparent member and a second position where said nozzle is retreated from said surface of said transparent member after washing; and
        a surface of said decoration cover assembly forms a front face of said headlamp apparatus together with said surface of said transparent member when said nozzle section takes said second position, so that said decoration cover assembly is visually recognizable as a part of a light irradiation unit that functions independently of said light irradiation unit.

2. The vehicular headlamp apparatus according to claim 1, wherein said decoration cover assembly is provided thereon with a transparent member, so that a surface of said transparent member forms a front face of said headlamp apparatus together with said transparent member when said nozzle section takes said second position.

3. The vehicular headlamp apparatus according to claim 1, wherein said decoration cover assembly is provided thereon with a lens member, so that a surface of said lens member forms a front face of said headlamp apparatus together with said lens member when said nozzle section takes said second position.

4. A vehicular headlamp apparatus having a washing function, said apparatus comprising:
    a light irradiation unit provided in a lamp housing that is composed of a transparent member and a lamp body; and
    a washing unit for washing a surface of said transparent member, wherein said washing unit injects washing liquid from an injection nozzle thereof to said transparent member when said washing unit is caused to protrude ahead of a surface of said transparent member;

a nozzle section of said washing unit that includes said injection nozzle is provided with a cover assembly; and a reflection section is provided in said cover assembly so that light entering said cover assembly from a light source of said light irradiation unit is reflected by said reflection section and radiates frontward.

5. The vehicular headlamp apparatus according to claim 4, wherein a surface of said cover assembly forms a front face of said headlamp apparatus together with said transparent member when said injection nozzle of said washing unit is retreated and housed in said headlamp apparatus.

6. The vehicular headlamp apparatus according to claim 4, wherein said cover assembly of said washing unit is provided adjacent to said lamp body, and a surface of said cover assembly forms a front face of said headlamp apparatus together with said transparent member of said light irradiation unit, when said injection nozzle of said washing unit is retreated.

7. The vehicular headlamp apparatus according to claim 4, wherein said cover assembly of said washing unit is provided adjacent to said light irradiation unit, and a surface of said cover assembly forms a front face of said headlamp apparatus together with said transparent member of said light irradiation unit, when said injection nozzle of said washing unit is retreated.

8. The vehicular headlamp apparatus according to claim 4, wherein a reflecting surface is formed on said reflection section of said cover assembly is provided with a reflecting surface, and said reflecting surface has an optical axis that is set in substantially the same direction as an optical axis of a light source of said light irradiation unit installed adjacent to said washing unit.

* * * * *